United States Patent
Mukai et al.

(10) Patent No.: US 9,184,609 B2
(45) Date of Patent: Nov. 10, 2015

(54) OVERCURRENT AND OVERVOLTAGE PROTECTING FUSE FOR BATTERY PACK WITH ELECTRODES ON EITHER SIDE OF AN INSULATED SUBSTRATE CONNECTED BY THROUGH-HOLES

(75) Inventors: Koichi Mukai, Ishikawa (JP); Masahiko Ishimaru, Ishikawa (JP); Takahiro Asada, Ishikawa (JP); Chisato Komori, Ishikawa (JP); Shoko Nagaki, Ishikawa (JP)

(73) Assignee: Dexerials Corporation, Tokyo (JP)

( * ) Notice: Subject to any disclaimer, the term of this patent is extended or adjusted under 35 U.S.C. 154(b) by 484 days.

(21) Appl. No.: 13/639,966

(22) PCT Filed: Apr. 7, 2011

(86) PCT No.: PCT/JP2011/058845
§ 371 (c)(1),
(2), (4) Date: Oct. 8, 2012

(87) PCT Pub. No.: WO2011/126091
PCT Pub. Date: Oct. 13, 2011

(65) Prior Publication Data
US 2013/0049679 A1 Feb. 28, 2013

(30) Foreign Application Priority Data
Apr. 8, 2010 (JP) .................. 2010-089613

(51) Int. Cl.
*H01M 10/48* (2006.01)
*H02J 7/00* (2006.01)
(Continued)

(52) U.S. Cl.
CPC ............ *H02J 7/0031* (2013.01); *H01H 85/046* (2013.01); *H01H 85/463* (2013.01);
(Continued)

(58) Field of Classification Search
CPC ............ H01H 85/046; H01H 85/0047; H01H 85/0052
USPC .......... 320/107, 119; 337/159, 182, 183, 290, 337/296, 297, 416
See application file for complete search history.

(56) References Cited

U.S. PATENT DOCUMENTS 4,246,563 A * 1/1981 Noerholm .................. 337/296
4,259,564 A * 3/1981 Ohkubo et al. ............ 347/208
(Continued)

FOREIGN PATENT DOCUMENTS

CN 101465251 * 6/2009
JP 63-181507 U 11/1988
(Continued)

OTHER PUBLICATIONS

International Seach Report w/translation issued in PCT/JP2011/058845 mailed May 10, 2011 (4 pages).

*Primary Examiner* — Drew A Dunn
*Assistant Examiner* — John Trischler
(74) *Attorney, Agent, or Firm* — Osha Liang LLP (57) ABSTRACT

A protection element, connected onto an electric current path of an electric circuit, is provided with an insulating substrate, a heating resistor formed on one surface of the insulating substrate with a first insulating layer interposed therebetween, a low-melting-point metal body disposed above the heating resistor with a second insulating layer interposed therebetween and that constitutes part of the electric current path, and connection portions connected to both ends of the low-melting-point metal body and that electrically connect the electric current path and the low-melting-point metal body. The connection portions are formed on the surface of the insulating substrate with a first glass layer interposed therebetween.

14 Claims, 8 Drawing Sheets (51) Int. Cl.
  *H01H 85/046* (2006.01)
  *H01M 10/42* (2006.01)
  *H01H 85/46* (2006.01)
  *H01H 85/02* (2006.01)

(52) U.S. Cl.
  CPC ............ *H01M10/425* (2013.01); *H01M 10/48* (2013.01); *H01H 2085/0275* (2013.01); *H01M 10/4264* (2013.01); *H01M 2200/00* (2013.01); *H01M 2200/10* (2013.01); *H01M 2200/108* (2013.01)

(56) References Cited

U.S. PATENT DOCUMENTS

| | | | | |
|---|---|---|---|---|
| 4,580,439 A * | 4/1986 | Manaka | ...................... | 73/31.06 |
| 4,691,224 A * | 9/1987 | Takada | .......................... | 257/495 |
| 5,267,138 A * | 11/1993 | Shores | ............................. | 363/98 |
| 5,296,833 A * | 3/1994 | Breen et al. | .................... | 337/297 |
| 5,345,210 A * | 9/1994 | Swensen et al. | ............. | 337/163 |
| 5,376,820 A * | 12/1994 | Crafts et al. | ................... | 257/529 |
| 5,597,183 A * | 1/1997 | Johnson | .......................... | 283/83 |
| 5,682,057 A * | 10/1997 | Kuriyama | .................... | 257/529 |
| 5,712,610 A * | 1/1998 | Takeichi et al. | ............... | 337/290 |
| 5,907,272 A * | 5/1999 | McGuire | ..................... | 338/22 R |
| 5,963,019 A * | 10/1999 | Cheon | .......................... | 320/150 |
| 6,034,589 A * | 3/2000 | Montgomery et al. | ........ | 337/296 |
| 6,219,215 B1 * | 4/2001 | Bertin et al. | ................. | 361/93.8 |
| 6,269,745 B1 * | 8/2001 | Cieplik et al. | ............. | 102/202.5 |
| 6,351,361 B1 * | 2/2002 | Kawazu et al. | ................ | 361/103 |
| 6,452,475 B1 * | 9/2002 | Kawazu et al. | ................ | 337/290 |
| 6,489,879 B1 * | 12/2002 | Singh et al. | .................... | 337/167 |
| 6,838,971 B2 * | 1/2005 | Senda et al. | .................. | 337/296 |
| 7,385,475 B2 * | 6/2008 | Bender et al. | ................. | 337/297 |
| 7,477,130 B2 * | 1/2009 | Fukushige et al. | ............ | 337/297 |
| 7,528,573 B2 * | 5/2009 | Hong et al. | .................... | 320/112 |
| 7,659,804 B2 * | 2/2010 | Harris et al. | ................... | 337/159 |
| 8,472,158 B2 * | 6/2013 | Wang et al. | ................... | 361/104 |
| 8,803,652 B2 * | 8/2014 | Kimura et al. | ................. | 337/186 |
| 2001/0002051 A1 * | 5/2001 | Matsumoto | .................... | 257/177 |
| 2002/0079865 A1 * | 6/2002 | Thomas et al. | ................. | 320/136 |
| 2003/0142453 A1 * | 7/2003 | Parker et al. | .................. | 361/104 |
| 2004/0119400 A1 * | 6/2004 | Takahashi et al. | ........... | 313/504 |
| 2004/0184211 A1 * | 9/2004 | Bender et al. | .................. | 361/104 |
| 2005/0140021 A1 * | 6/2005 | Wakisaka et al. | .............. | 257/777 |
| 2005/0141164 A1 * | 6/2005 | Bender et al. | .................. | 361/104 |
| 2006/0172152 A1 * | 8/2006 | Lee | ................................ | 428/698 |
| 2009/0009281 A1 * | 1/2009 | Wang et al. | ..................... | 337/297 |
| 2009/0065047 A1 * | 3/2009 | Fiorenza et al. | .............. | 136/255 |
| 2009/0114429 A1 * | 5/2009 | Sri-Jayantha et al. | ........ | 174/255 |
| 2011/0012704 A1 * | 1/2011 | Kimura et al. | ................. | 337/168 |
| 2011/0057761 A1 * | 3/2011 | Wang et al. | ..................... | 337/297 |
| 2011/0058295 A1 * | 3/2011 | Wang et al. | ..................... | 361/79 |
| 2011/0058372 A1 * | 3/2011 | Lerman et al. | ................. | 362/235 |
| 2012/0001720 A1 * | 1/2012 | Kimura et al. | ................. | 337/297 |
| 2012/0293120 A1 * | 11/2012 | Jang et al. | ....................... | 320/108 |
| 2014/0340046 A1 * | 11/2014 | Komori et al. | ................. | 320/134 |

FOREIGN PATENT DOCUMENTS

| | | | |
|---|---|---|---|
| JP | 2-105490 A | | 4/1990 |
| JP | 2-145507 U | | 12/1990 |
| JP | 10-50184 A | | 2/1998 |
| JP | 10-136581 A | | 5/1998 |
| JP | 10-162714 A | | 6/1998 |
| JP | 2002-75151 A | | 3/2002 |
| JP | 2006066313 A | * | 3/2006 |
| JP | 2006086089 A | * | 3/2006 |
| JP | 2006155966 A | * | 6/2006 |
| JP | 2006286224 A | * | 10/2006 |
| JP | 2006344477 A | * | 12/2006 |
| JP | 2007087783 A | * | 4/2007 |
| JP | 2007095592 A | * | 4/2007 |
| JP | 2008052989 A | * | 3/2008 |
| JP | 2009016338 A | * | 1/2009 |
| JP | 2009-259724 A | | 11/2009 |
| TW | 242876 | * | 11/2005 |
| WO | WO 2009060607 A1 | * | 5/2009 |
| WO | WO 2009104279 A1 | * | 8/2009 |

* cited by examiner

OVERCURRENT AND OVERVOLTAGE PROTECTING FUSE FOR BATTERY PACK WITH ELECTRODES ON EITHER SIDE OF AN INSULATED SUBSTRATE CONNECTED BY THROUGH-HOLES

FIELD OF THE INVENTION

This invention relates to a protection element that protects a battery constituted by battery cells capable of being charged and discharged and a charging/discharging control circuit, and also concerns a battery control device and a battery pack in which this protection element is incorporated.

The present application claims priority rights to JP Patent Application 2010-89613 filed in Japan on Apr. 8, 2010, which is hereby incorporated by reference.

BACKGROUND OF THE INVENTION

Figure 9:
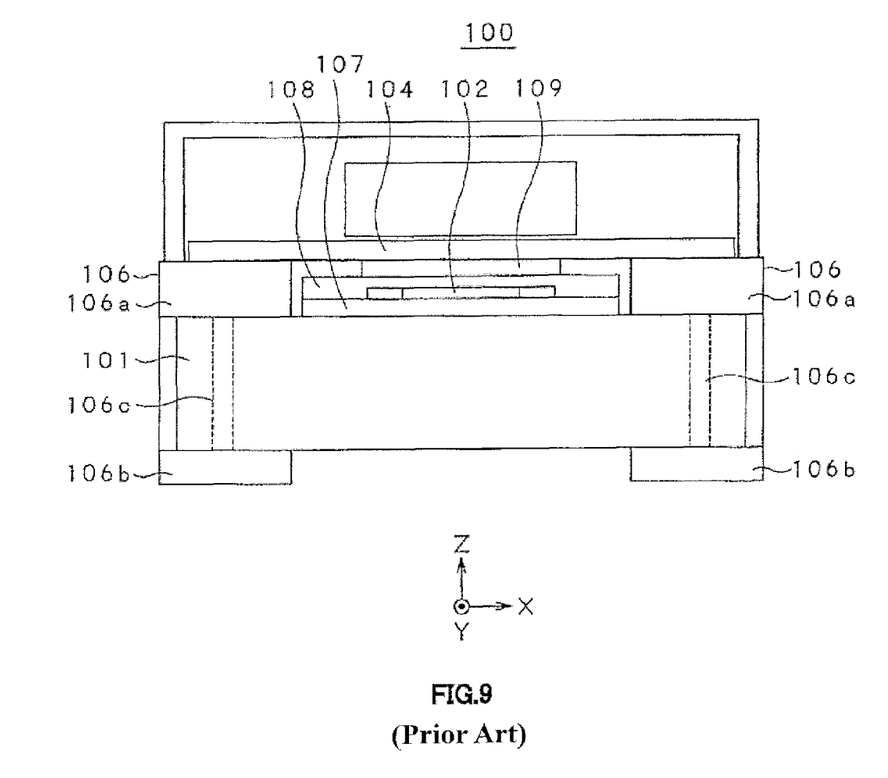
FIG. 9 is a cross-sectional view showing a conventional protection element.

As a protection element that can prevent not only an overcurrent but also an overvoltage and is effectively used for a battery pack or the like for a portable electronic apparatus, a protection element has been proposed in which a low-melting-point metal body is placed on a charging/discharging electric current path of a battery cell so as to be interposed therebetween, with a heating resistor being disposed near the low-melting-point metal body. As shown in FIG. 9, a protection element 100 of this type generally has a structure in which a heating resistor 102 is formed on an insulating substrate 101 made of a ceramic material such as alumina, with a low-melting-point metal body 104 being disposed on the heating resistor 102.

The low-melting-point metal body 104 is formed on the insulating substrate 101, and connected to a conductive layer 106 connected between a battery cell and a charging/discharging circuit to form a charging/discharging electric current path of the battery cell. The conductive layer 106 is provided with a pair of surface electrodes 106a that are formed on the surface of the insulating substrate 101 so as to be opposed to each other, a pair of rear face electrodes 106b that are formed on the rear face of the insulating substrate 101 so as to be opposed to each other, and terminal electrodes 106c that connect the surface electrodes 106a and the rear face electrodes 106b respectively. One of the rear face electrodes 106b is connected to the battery cell, and the other thereof is connected to the charging/discharging circuit.

The heating resistor 102 is connected to a current control element through a conductive pattern, not shown, formed on the insulating substrate 101, and is also connected to the charging/discharging electric current path with the low-melting-point metal body 104 interposed therebetween. Moreover, the heating resistor 102 is formed on the surface of the insulating substrate 101, with a first insulating layer 107 made of a glass layer being interposed therebetween, and a second insulating layer 108 made of a glass layer is formed above the substrate. The low-melting-point metal body 104, which is formed on the second insulating layer 108 with the conductor 109 interposed therebetween, is also connected with the heating resistor 102.

Thus, in the case when upon occurrence of an abnormal state such as an overcharging state, an overdischarging state, or the like, of the battery cell, an excessive current flows through the heating resistor 102, the current is controlled by the current control element so as to flow from the battery cell to the heating resistor 102 so that the low-melting-point metal body 104 is fused by heat generated from the heating resistor 102, thereby shutting down the charging/discharging electric current path.

PRIOR-ART DOCUMENTS

Patent Document

Patent Document 1: JP-A No. 2009-259724

SUMMARY OF THE INVENTION

In the protection element 100 of this type, the low-melting-point metal body 104 is fused by using heat generated from the heating resistor 102 so that the charging/discharging electric current path directed from the battery cell is shut down; therefore, in order to quickly shut down the charging/discharging path upon occurrence of an abnormal state, it is necessary to efficiently transfer heat from the heating resistor 102 to the low-melting-point metal body 104.

However, in the conventional protection element 100, since first and second insulating layers 107 and 108, formed on the periphery of the low-melting-point metal body 104, are made of glass, those layers have a low thermal conductivity, thereby failing to efficiently transfer heat of the heating resistor 102 to the low-melting-point metal body 104.

Moreover, in the conventional protection element 100, heat generated by the heating resistor 102 is transmitted to the insulating substrate 101 through the low-melting-point metal body 104 and the surface electrode 106a, and is also transmitted to the insulating substrate 101 through the first insulating layer 107. Since insulation substrate of the conventional protection element 100 is made from a material, such as alumina, that has a high thermal conductivity, a heat transfer path through which the heat generated from the heating resistor 102 is transmitted to the insulating substrate 101 through the first insulating layer 107 and another heat transfer path through which the heat is transmitted to the insulating substrate 101 through the conductive layer 106 tend to be formed, with the result that it becomes difficult to efficiently raise the temperature of the low-melting-point metal body 104.

In view of this problem, an object of the present invention is to provide a protection element, a battery control device and a battery pack that efficiently transfer heat from a heating resistor to a low-melting-point metal body through a heat transfer path thereof, without allowing the heat to escape, and upon occurrence of an abnormal state, such as an overcharging, or overdischarging state of the buttery cell, can quickly shut down the charging/discharging electric current path of the buttery cell.

In order to solve the above problems, a protection element in accordance with the present invention, which is connected onto an electric current path of an electric circuit, includes: an insulating substrate; a heating resistor which is formed on one surface of the insulating substrate with a first insulating layer interposed therebetween; a low-melting-point metal body which is disposed above the heating resistor with a second insulating layer interposed therebetween and constitutes part of the electric current path; and connection portions which are connected to both ends of the low-melting-point metal body and electrically connect the electric current path and the low-melting-point metal body, and in this structure, the connection portions are formed on the one surface of the insulating substrate with a third insulating layer interposed therebetween.

Moreover, a battery control device in accordance with the present invention includes: a charging/discharging control circuit that is connected onto a charging/discharging electric current path of a battery constituted by a battery cell capable of being charged and discharged, and controls the charging/discharging operation of the battery; a detection circuit for detecting a voltage value of the battery cell; a protection element which shuts down the charging/discharging electric current path, when a voltage value of the battery cell detected by the detection circuit gets out of a predetermined range; and a current control element that drives the protection element, and in this structure, the protection element further includes: an insulating substrate; a heating resistor which is formed on one surface of the insulating substrate with a first insulating layer interposed therebetween; a low-melting-point metal body which is disposed above the heating resistor with a second insulating layer interposed therebetween and constitutes part of the electric current path; and connection portions which are connected to both ends of the low-melting-point metal body and electrically connect the electric current path and the low-melting-point metal body, with the connection portions being formed on the one surface of the insulating substrate with a third insulating layer interposed therebetween.

Moreover, the battery pack relating to the present invention is constituted by a battery made of a battery cell capable of being charged and discharged, and a charging/discharging control circuit that controls a charging/discharging operation of the battery, a detection circuit that detects a voltage value of the battery cell, a protection element that shuts off the charging/discharging electric current path when the voltage value of the battery cell detected by the detection circuit gets out of a predetermined range, and a current control element that drives the protection element, and the protection element is constituted by an insulating substrate, a heating resistor formed on one surface of the insulating substrate with a first insulating layer interposed therebetween, a low-melting-point metal body that is placed above the heating resistor with a second insulating layer interposed therebetween so as to form one portion of the charging/discharging electric current path, and connection portions that are connected to two ends of the low-melting-point metal body so as to electrically connect the charging/discharging electric current path and the low-melting-point metal body with each other, with the connection portions being formed on the one surface of the insulating substrate with a third insulating layer interposed therebetween.

Effects of the Invention

In accordance with the present invention, since the third insulating layer is formed between the substrate and the connection portions, it becomes possible to suppress heat of the heating resistor from being radiated from the connection portions toward the insulating substrate side through the low-melting-point metal body, so that the heat can be efficiently accumulated in the low-melting-point metal body so as to be quickly fused and disconnected.

DETAILED DESCRIPTION OF THE INVENTION

Referring to Figs., the following description will discuss a protection element, a battery control device and a battery pack to which the present invention is applied in detail. Additionally, the present invention is not intended to be limited only by the following embodiment, and it is needless to say that various modifications may be made therein within the scope without departing from the gist of the present invention.

Figure 1:
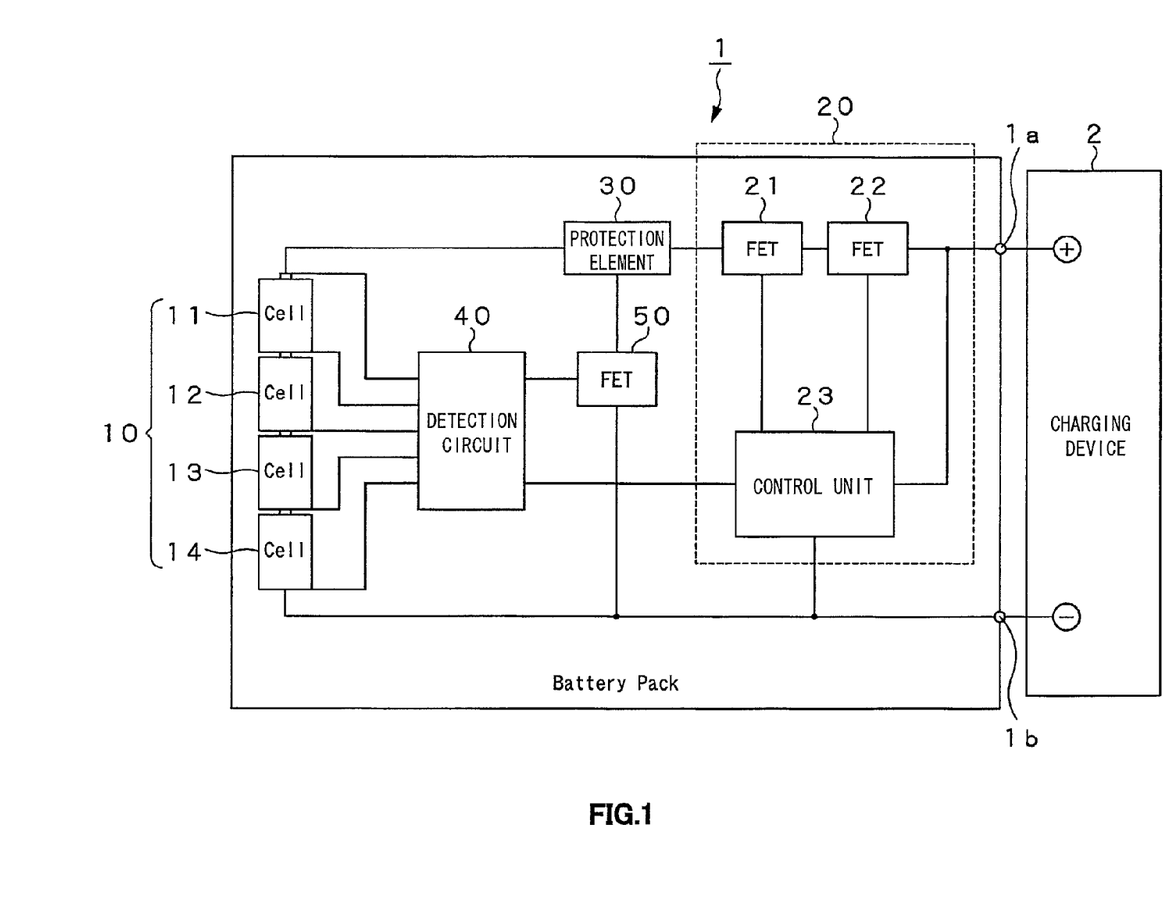
FIG. 1 is a drawing that shows an entire structure of a battery pack to which the present invention is applied.

The protection element to which the present invention is applied is, for example, an element for protecting a battery made of a battery cell capable of being charged and discharged and a charging/discharging control circuit, and as shown in FIG. 1, the protection element is incorporated into a battery pack 1 to be used, which has a battery 10 composed of a plurality of battery cells, that is, in this case, total four battery cells 11 to 14 capable of being charged and discharged.

The battery pack 1 is composed of the battery 10, a charging/discharging control circuit 20 for controlling charging and discharging operations of the battery 10, a protection element 30 used for protecting the battery 10 and the charging/discharging control circuit 20, a detection circuit 40 for detecting voltages of the respective battery cells 11 to 14, and a current control element 50 for controlling operations of the protection element 30 in accordance with the detection results of the detection circuit 40.

As described above, the battery 10 has a structure in which, for example, battery cells 11 to 14, such as lithium ion secondary batteries that are required for being controlled so as not to be overcharged and overdischarged, are series-connected to one another, and detachably connected to the charging device 2 through a positive terminal 1a and a negative terminal 1b of the battery pack 1, and a charging voltage from the charging device 2 is applied thereto.

The charging/discharging control circuit 20 is provided with two current control elements 21 and 22 that are series-connected to the charging/discharging electric current path through which a current flows from the battery 10 to the charging device 2, and a control unit 23 for controlling operations of these current control elements 21 and 22. The current control elements 21 and 22 are constituted by, for example, field-effect transistors (hereinafter, referred to as "FET"), and by using a gate voltage controlled by the control unit 23, continuity and shutdown of the charging/discharging electric current path are controlled. The control unit 23 is operated upon receipt of a power supply from the charging device 2, and in response to the detection result of the detection circuit 40, controls the operations of the current control elements 21 and 22 so as to shut down the charging/discharging electric current path when the battery 10 is in an overdischarged or overcharged state.

The protection element 30 is connected onto a charging/discharging electric current path between the battery 10 and the charging/discharging control circuit 20, and its operations are controlled by the current control element 50.

The detection circuit 40, which is connected to the respective battery cells 11 to 14, detects voltage values of the respective battery cells 11 to 14, and supplies the respective voltage values to the control unit 23 of the charging/discharging control circuit 20. In the case when any one of the battery cells has an overcharged voltage or an overdischarged voltage, the detection circuit 40 outputs a control signal for use in controlling the current control element 50.

In the case when the voltage value of any one of the battery cells 11 to 14 gets out of a predetermined range, more specifically, when it becomes an overcharged or overdischarged state, the current control element 50 operates the protection element 30 in response to a control signal outputted from the detection circuit 40 so that the charging/discharging electric current path of the battery 10 is controlled to be shut down.

Next, the following description will discuss the structure of the protection element 30. The protection element 30 to which the present invention is applied allows a fuse to positively melt down by the heat of the resistor in response to a wide range of voltage fluctuations of the battery 10 so that the charging/discharging electric current path of the battery 10 is shut down, and has a circuit structure as shown in FIG. 2.

Figure 2:
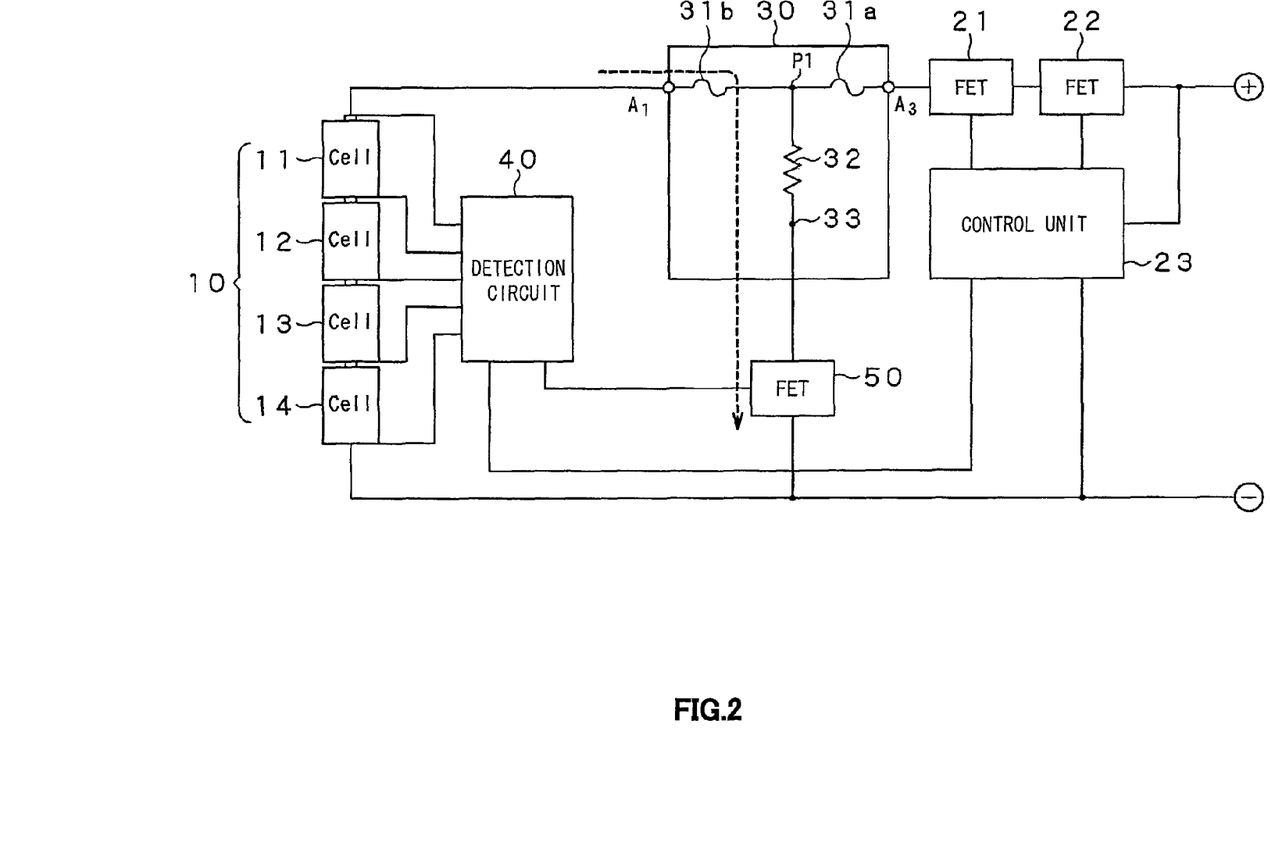
FIG. 2 is a drawing that shows a circuit structure of a battery pack to which the present invention is applied.

That is, as shown in FIG. 2, the protection element 30 is provided with fuses 31a and 31b, each made of a low-melting-point metal body to be fused and disconnected upon application of heat, and a resistor 32 that generates heat for fusing the fuses 31a and 31b when energized.

The fuses 31a and 31b are elements that, for example, physically separate one low-melting-point metal body on the circuit structure so as to be series-connected to each other through a connecting point P1, and are series-connected to each other on the charging/discharging electric current path between the battery 10 and the charging/discharging control circuit 20. For example, the fuse 31a is connected to the charging/discharging control circuit 20 through a connecting point A3 that is not connected to the fuse 31b, and the fuse 31b is connected to the battery 10 through a connecting point A1 that is not connected to the fuse 31a.

The resistor 32 has its one end provided with the connecting point P1 to the fuses 31a and 31B and the other end connected to a terminal portion 33 to be connected to the current control element 50. Moreover, when energized by the current control element 50, the resistor 32 generates heat that fuses the low-melting-point body forming the fuses 31a and 31b.

Figure 3:
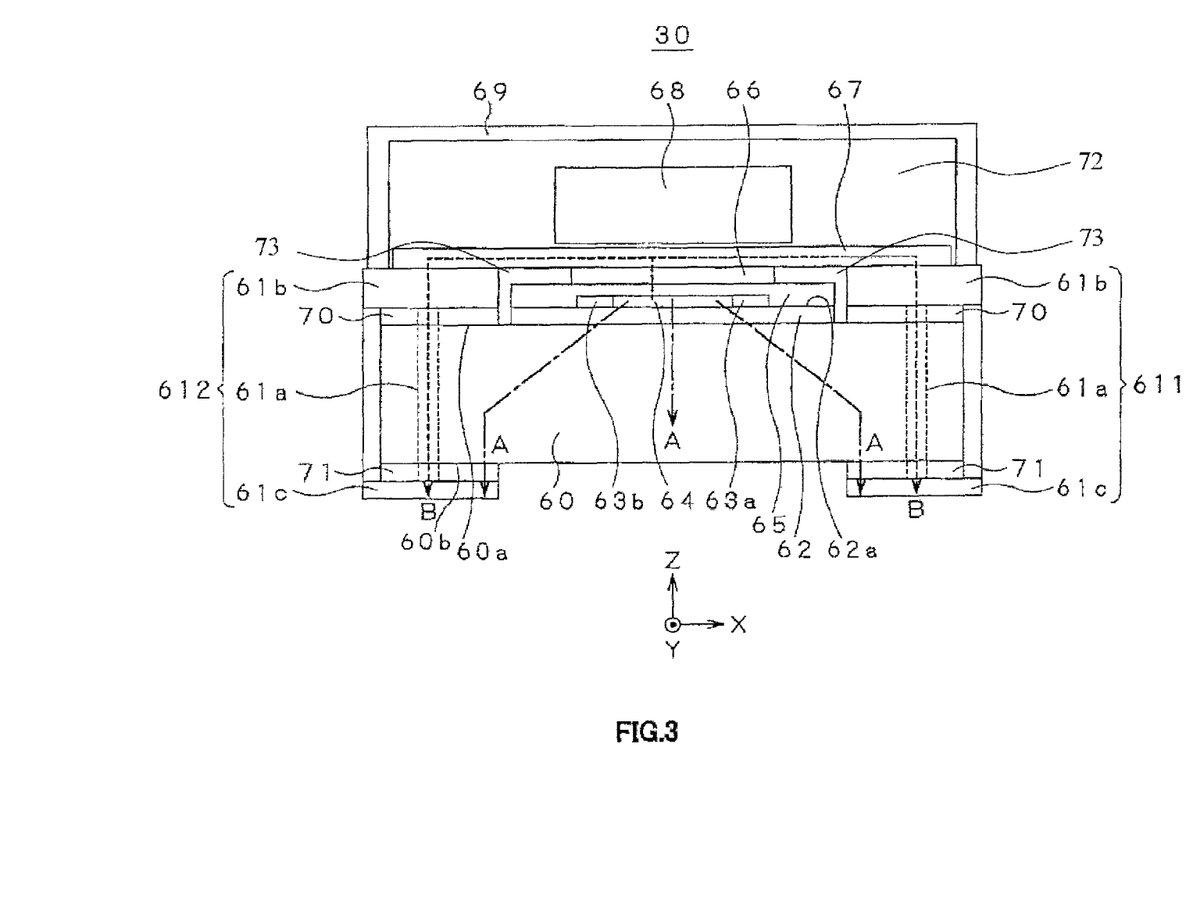
FIG. 3 is a cross-sectional view showing a protective element to which the present invention is applied.
Figure 4A:
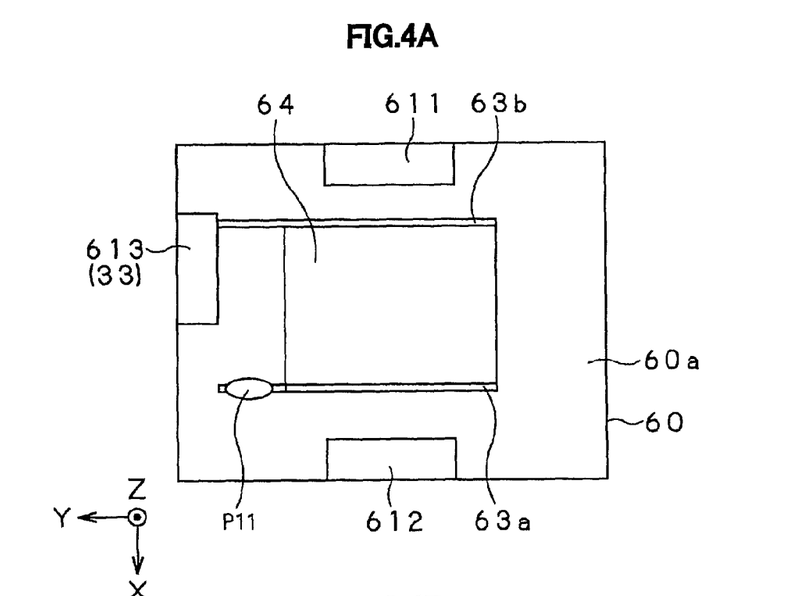
FIGS. 4A and 4B are plan views that explain a layer structure of the protection element to which the present invention is applied.
Figure 4B:
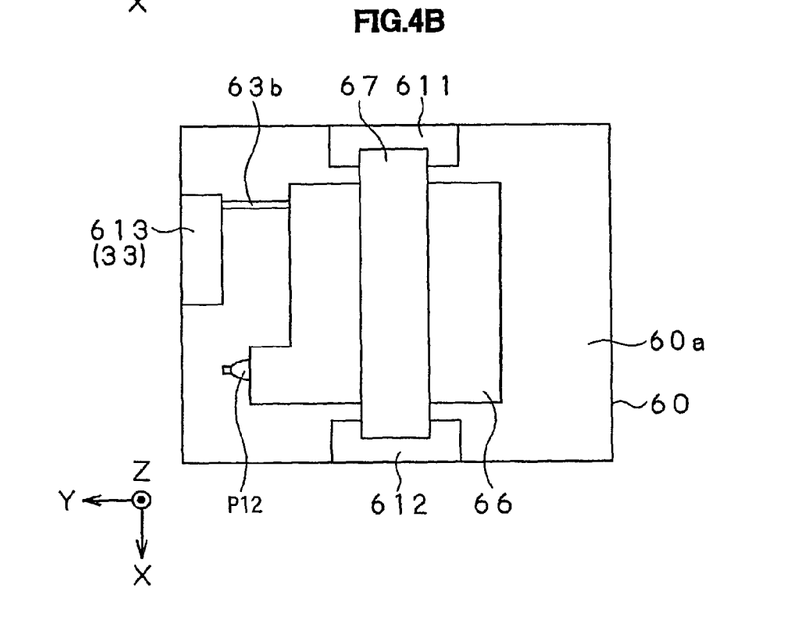

The protection element 30 having the above-mentioned circuit structure is realized by a structural body, for example, shown in FIGS. 3, 4A and 4B. FIG. 3 shows a cross-sectional view taken from an xz plane of the protection element 30 disposed based upon three-dimensional orthogonal coordinate axes xyz. Moreover, FIGS. 4A and 4B are drawings that explain a laminated structure of the protection element 30 viewed from an xy plane.

The protection element 30 is constituted by a heat generating resistor 64 formed on one surface 60a of the substrate 60 having a rectangular shape, made of a ceramic material or the like, with an insulating layer interposed therebetween, a low-melting-point metal body 67 formed above the heating resistor 64 with an insulating layer interposed therebetween so as to form one portion of the charging/discharging electric current path, and connection portions 611 to 613 that are connected to two ends of the low-melting-point metal body 67 and connect the charging/discharging electric current path with the low-melting-point metal body 67. Moreover, the protection element 30 has such a structure that the connection portions 611 and 612 are formed on the substrate 60, with low-heat conductive glass layers 70 and 71 interposed therebetween.

As the material for the insulating substrate 60, for example, a ceramic material, such as alumina, having high mechanical strength, is used. The alumina allows the substrate 60 to have high mechanical strength, with superior processability and easiness in handling, but in contrast, has a high thermal conductivity of about 25 W/m·K. Moreover, the substrate 60 may be formed by using a material having a comparatively low thermal conductivity, such as a glass-ceramics material formed by mixing alumina and a glass-based material; however, since the substrate 60 becomes fragile correspondingly due to the contained glass or the like, the processability and durability are impaired, and in the case when the glass-based material is not uniformly mixed, deviations occur in strength and thermal conductivity, and production costs are increased. Since the protection element 30 has the laminated structure with the glass layers 70 and 71 formed on the two surfaces of the substrate 60, as will be described later, heat of the heating resistor 64 is efficiently transmitted to the low-melting-point metal body 67 so that alumina may be used as the substrate 60.

When mechanical strength and thermal conductivity are taken into consideration, examples of materials applicable to the substrate 60 include: alumina ($Al_2O_3$, thermal conductivity: 25 W/m·K), a mixture in which 30% of mullite ($3Al_2O_3 \cdot 2SiO_2$) is added to 70% of alumina (thermal conductivity: 7 W/m·K), a mixture in which 50% of mullite is added to 50% of alumina (thermal conductivity: 4 W/m·K) and zirconia ($ZrO_2$: thermal conductivity: 3 W/m·K).

In the case when, among these, the mixture in which 50% of mullite is added to 50% of alumina having a thermal conductivity of 5 W/m·K or less, or zirconia is used as the material for the substrate 60, heat radiation by the substrate 60 is suppressed in addition to suppression of heat radiation by the glass layers 70 and 71 so that heat from the heating resistor 64 is further efficiently transmitted to the low-melting-point metal body 67.

Moreover, in FIG. 3, with respect to the substrate 60 positioned on the XY plane, connection portions 611 to 613 that connect the protection element 30 with the charging device 2, the battery 10 and the current control element 50 are formed on the side face portions thereof. Each of the connection portions 611 to 613 is provided with a conductor 61b formed on one surface 60a of the substrate 60, a conductor 61c formed on the other surface 60b of the substrate 60 and a through hole 61 that connects the conductor 61b and the conductor 61c that are formed so as to penetrate the inside of the substrate 60 in a z-direction.

Among these three connection portions 611 to 613, the opposing two connection portions 611 and 612 form a contact at which the respective conductors 61c are connected to the battery 10 and the charging/discharging control circuit 20 respectively. Moreover, the other connection portion 613 functions as a terminal portion 33 by which the conductor 61c is connected to the current control element 50.

On to the connection portions 611 to 613, a conductor paste is printed onto predetermined places of the substrate 60 so as to form the conductor 61b, the conductor 61c and the through hole 61a. As the conductive material for use in forming the connection portions 611 to 613, for example, silver, copper and tungsten (W) may be used.

The connection portions 611 and 612 have their respective conductors 61b formed on one surface 60a of the substrate 60, with a first glass layer 70 serving as an insulating layer interposed therebetween. Moreover, the connection portions 611 and 612 have also their respective conductors 61c formed on the other surface 60b of the substrate 60, with a second glass layer 71 serving as an insulating layer interposed therebetween.

Furthermore, in the center portion of the one surface 60a of the substrate 60, a plate-shaped first insulating layer 62 is formed. On the surface 62a of this first insulating layer 62, a conductor pattern 63a, a heating resistor 64 connected to the conductor pattern 63a and a conductor pattern 63b connected to the heating resistor 64 are assembled. In this case, the conductor pattern 63b is connected to the conductor 61b of the connection portion 613 serving as a terminal unit 33, and the conductor pattern 63a is connected to the low-melting-point metal body 67 through the conductor 66. In this connection relationship, the protection element 30 has a structure in which the connection portion 613 serving as the terminal unit 33 is connected to the low-melting-point metal body 67, with the conductor pattern 63b, heating resistor 64 and the conductor pattern 63a interposed therebetween, via the conductor 66.

As the material for the heating resistor 64, for example, ruthenium (Ru), silicon carbide (SiC, specific resistivity: 10 Ω·cm), molybdenum silicide ($MoSi_2$, specific resistivity: 2.E+0.5 Ω·cm), lanthanum•chromium oxide ($LaCrO_3$) and carbon (C, specific resistivity: 1.00 E−3 Ω·cm) may be used.

The conductor patterns 63a, 63b and the heating resistor 64 are coated with the second insulating layer 65. Moreover, on the coated surface of the second insulating layer 65, the low-melting-point metal body 67 is assembled with the conductor 66 interposed therebetween. In this case, the conductor 66 and the low-melting-point metal body 67 are connected to each other by solder (not shown).

Moreover, one of the end portions P11 of the conductor pattern 63a is connected to the low-melting-point metal body 67 through P12 of the conductor 66. More specifically, when such a connection is made, as shown in FIG. 4A showing the protection element 30 viewed in a-z direction, on the first insulating layer 62, the conductor patterns 63a and 63b are formed and the contact P11 is formed on the terminal portion of the conductor pattern 63a on the packaged surface on which the heating resistor 64 is assembled. As shown in FIG. 4B, the conductor 66 is coated with the second insulating layer 65 interposed therebetween so that the point P11 and the point P12 of the conductor 66 are connected to each other, and on the conductor 66, the low-melting-point metal body 67 is further assembled. That is, the terminal portion P11 is placed on the outer side from the peripheral portion of the heating resistor 64, and the terminal portion P12 is placed on the outer side from the peripheral portion of the second insulating layer 65 so that when the respective members are stacked, the end portions P11 and P12 are made coincident with each other.

The low-melting-point metal body 67 is connected to the respective conductors 61b of the connection portions 611 and 612 that function as contacts to be connected to the battery 10 and the charging/discharging control circuit 20, through solder. Moreover, on the upper surface of the low-melting-point metal body 67, flux 68 is formed. Furthermore, the upper portion of the low-melting-point metal body 67 is covered with a cap 69.

When an abnormal state, such as an overcharging, or overdischarging state of the buttery cells 11 to 14 is detected through a voltage detection by the detection circuit 40, the protection element 30 outputs a control signal to the current control element 50. Upon receipt of the control signal, the current control element 50 energizes the heating resistor 64 to generate heat. The protection element 30 transmits the heat of the heating resistor 64 to the low-melting-point metal body 67 through the second insulating layer 65 and the conductor 66 so that the low-melting-point metal body 67 is fused. Thus, in the protection element 30, the respective conductors 61b of the connection portions 611 and 612 are separated from each other so as to shut down the charging/discharging electric current path of the battery 10.

In this structure, as paths through which heat of the heating resistor 64 is transmitted, the protection element 30 is provided with a first heat transfer path A that allows heat to be radiated toward the substrate 60 side through the first insulating layer 62 and a second heat transfer path B that allows heat to be radiated toward the substrate 60 side through the second insulating layer 65, the conductor 66, the low-melting-point metal body 67 and the conductor 61b, as shown in FIG. 3. Moreover, since it is necessary to shut down the charging/discharging electric current path immediately in response to the operation of the current control element 50, the protection element 30 desirably transfers heat of the heating resistor 64 efficiently to the low-melting-point metal body 67.

The protection element 30 has a structure in which the first glass layer 70 to form a third insulating layer is interposed between the conductor 61b located on the second heat transfer path B and one surface 60a of the substrate 60, with the second glass layer 71 to form a fourth insulating layer being interposed between the conductor 61c located on the second heat transfer path B and the other surface 60b of the substrate 60. Thus, the protection element 30 suppresses heat generated by the heating resistor 64 from radiating toward the substrate 60 side having a high thermal conductivity through the low-melting-point metal body 67 and the conductor 61b, and also suppresses the heat from radiating toward the conductor 61c side from the substrate 60 having a high thermal conductivity. Additionally, as the first and second glass layers 70 and 71 to form the third insulating layer and the fourth insulating layer, various kinds of glass may be desirably used.

Therefore, by suppressing heat radiation from the second heat transfer path B, the protection element 30 makes it possible to efficiently raise the temperature of the heating resistor 64 so that when energized by the current control element 50, it can immediately fuses the low-melting-point metal body 67, thereby shutting down the charging/discharging electric current path. Moreover, the protection element 30 efficiently transmits heat from heating resistor 64 to the low-melting-point metal body 67 so that even when the heating resistor 64 is miniaturized, it can sufficiently fuse the low-melting-point metal body 67, thereby making it possible to achieve a small size of the entire protection element 30. Furthermore, since the protection element 30 efficiently transmits heat from heating resistor 64 to the low-melting-point metal body 67, it becomes possible to reduce the quantity of current for use in energizing the heating resistor 64, and consequently to achieve low power consumption.

Additionally, in the protection element 30, the first glass layer 70 and the second glass layer 71 are formed only at positions where they are overlapped with the conductor 61b and the conductor 61c, and an air layer is formed on a first heat transfer path A sandwiched between the second glass layers 71 on the other surface 60b of the substrate 60. Since the air layer has a very low thermal conductivity (0.0241 W/m·K), heat radiation by the first heat transfer path A sandwiched between the second glass layers 71 can be suppressed, and correspondingly, more heat can be transmitted to the second heat transfer path B.

Moreover, the protection element 30 is desirably designed so that glass is used for the first and second insulating layers 62 and 65, and so that the second insulating layer 65 positioned on the second heat transfer path B has a thermal conductivity equal or greater than that of the first insulating layer 62 positioned on the first heat transfer path A. With this structure, the protection element 30 makes it possible to prevent that more of heat itself generated in the heating resistor 64 is radiated toward the first heat transfer path A side.

Furthermore, the protection element 30 is desirably designed so that as the second insulating layer 65 positioned on the second heat transfer path B, glass having a relatively higher thermal conductivity than that of the first insulating layer 62 positioned on the first heat transfer path A is preferably used. With this structure, the protection element 30 makes it possible to suppress heat generated from the heating resistor 64 from being radiated toward the substrate 60 side that is the side opposite to the low-melting-point metal body 67. Correspondingly, the protection element 30 makes it possible to transmit the heat generated from the heating resistor 64 toward the second heat transfer path B side, and consequently to efficiently raise the temperature of the low-melting-point metal body 67.

In this manner, as such glass having a relatively low thermal conductivity for use in forming the first insulating layer 62, for example, $SiO_2.B_2O_3.RO$ (thermal conductivity: 0.83 W/m·K) and $SiO_2.B_2O_3.PbO$ (thermal conductivity: 1.42 W/m·K) may be used. Moreover, as such glass having a relatively high thermal conductivity for use in forming the second insulating layer 65, for example, $SiO_2.B_2O_3.RO$ (thermal conductivity: 2.1 W/m·K) may be used.

Additionally, any glass may be used for the glass forming the first insulating layer 62 as long as it has a relatively low thermal conductivity in comparison with the glass forming the second insulating layer 65; therefore, in the case when $SiO_2.B_2O_3.RO$ (thermal conductivity: 0.83 W/m·K) is used as the glass forming the first insulating layer 62, $SiO_2.B_2O_3.PbO$ (thermal conductivity: 1.42 W/m·K) may be used as the glass forming the second insulating layer 65.

This protection element 30 is manufactured in the following manner. First, alumina, a mixture formed by mixing 50% of mullite in 50% of alumina, or a ceramic material such as zirconia, is used for forming the substrate 60. Next, penetrating holes forming through holes 61a that connect the conductor 61b and the conductor 61c with each other are formed, and a glass paste is printed by a screen printing process or the like so as to form the first glass layer 70 forming the third insulating layer and the first insulating layer 62, and by baking these, the first insulating layer 62 and the first glass layer 70 are formed on the same plane. That is, in the protection element 30, the same glass material is used as the glass for forming the first insulating layer 62 and the glass for forming the first glass layer 70.

In the same manner, the second glass layer 71 to form the fourth insulating layer is formed. Next, by printing a conductive paste and baking it, a conductor 61b is formed on the first glass layer 70, with through holes 61a being formed therein, while a heating resistor 64, a conductor pattern 63a and a conductor pattern 63b are formed. Moreover, by printing a conductive paste and baking it, a conductor 61c is formed on the second glass layer 71.

Next, by printing a glass paste and baking it, a second insulating layer 65 is formed, and after assembling the conductor 66, the low-melting-point metal body 67 and the flux 68 thereon, it is covered with a cap 69. Thus, the protection element 30 is manufactured.

EXAMPLES

The following description will discuss examples of the protection element 30.

In these examples, the protection element 30 was provided with a first glass layer 70 and a second glass layer 71, and a structure in which the first and second glass layers 70 and 71 had a thickness of 10 μm (example 1), a structure in which the first and second glass layers 70 and 71 had a thickness of 20 μm (example 2) and a structure in which the first and second glass layers 70 and 71 had a thickness of 40 μm (example 3) were prepared. Moreover, the protection element 30 was provided with only the first glass layer 70, and a structure in which the glass layer 70 had a thickness of 10 μm (example 4), a structure in which the glass layer 70 had a thickness of 20 μm (example 5) and a structure in which the glass layer 70 had a thickness of 40 μm (example 6) were prepared. As a comparative example, as shown in FIG. 9, a protection element 100 in which a conductive layer 106 was formed on an insulating substrate 101, without a glass layer formed thereon, was prepared.

With respect to these examples 1 to 6 and comparative example 1, the period of time required for reaching a predetermined temperature was measured. The measuring point of the temperature was set to virtually a center portion of the low-melting-point metal body 67 at the lower portion of the heating resistor 64.

Figure 5:
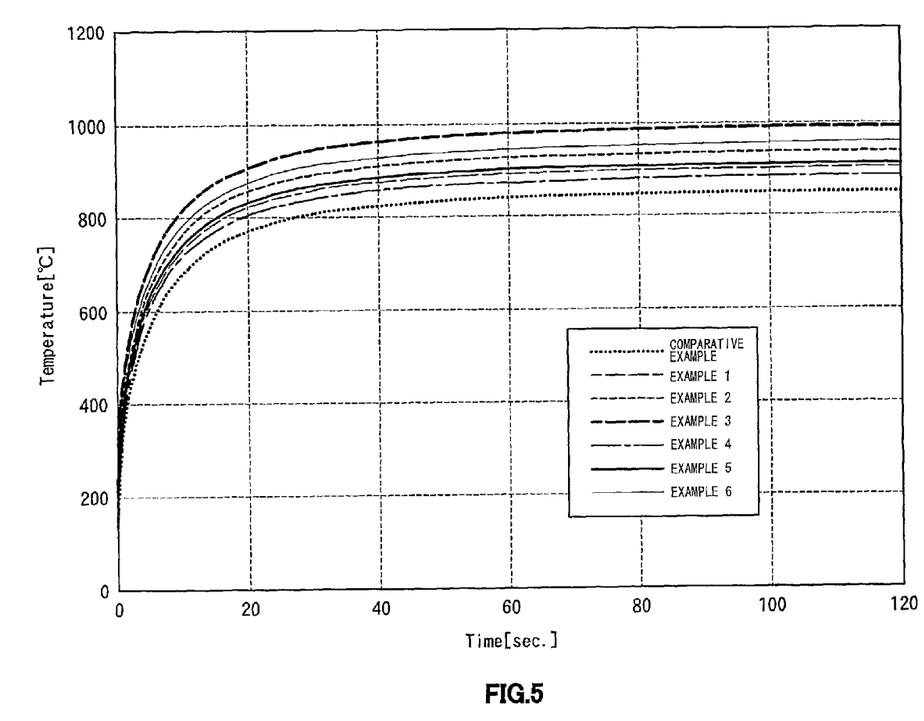
FIG. 5 is a graph that explains a temperature characteristic of the protection element to which the present invention is applied.

As shown in FIG. 5, when the period of time required for the measuring point to reach, for example, 800° C. was measured, it took about 20 seconds or less in examples 1 to 6, while it took about 30 seconds in comparative example 1.

Moreover, in examples, the temperature of example 3 was raised most quickly, and next, the temperatures of example 6, example 2, example 5, example 1 and example 4 were raised in this order. Thus, it was found that, even in the case when a glass layer was formed only on one surface 60a of the substrate 60, by making its thickness greater, it became possible to suppress heat caused by the heating resistor 64 from being radiated toward the substrate 60 side so that the heat was effectively transmitted to the low-melting-point metal body 67.

Additionally, in the protection element 30, a first glass layer 70 may also be formed between the conductor 61b of the connection portion 613 for connecting the heating resistor 64 with the current control element 50 and one surface 60a of the substrate 60. In this case, the first glass layer 70 makes it possible to suppress heat from the heating resistor 64 from being radiated toward the conductor 61b of the connection portion 613 and the substrate 60 through the conductor pattern 63b.

Figure 6:
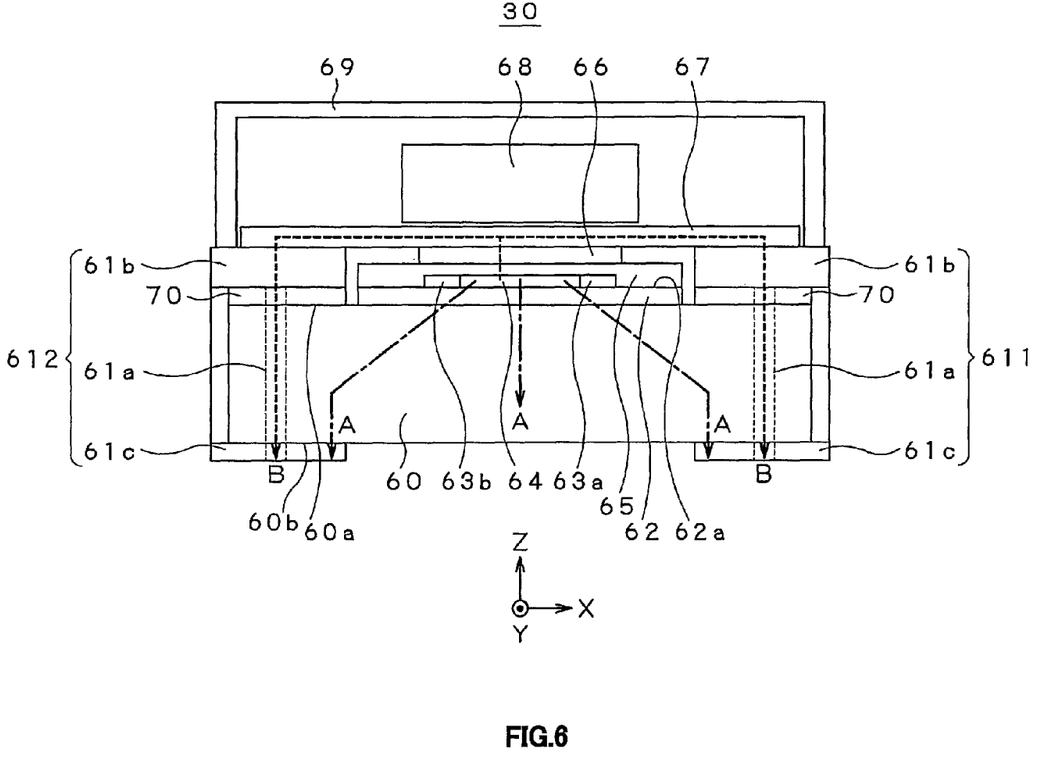
FIG. 6 is a cross-sectional view showing another protection element to which the present invention is applied.

Moreover, as shown in FIG. 6, the protection element 30 may have a structure in which, without forming the second glass layer 71, conductors 61c of the connection portions 611 and 612 are formed on the other surface 60b of the substrate 60. In this case also, by interposing the first glass layer 70 between the conductor 61b positioned on the second heat transfer path B and one surface 60a of the substrate 60, the protection element 30 makes it possible to suppress heat generated by the heating resistor 64 from being radiated toward the substrate 60 side having a high thermal conductivity through the low-melting-point metal body 67 and the conductor 61b.

Therefore, by suppressing heat radiation in the second heat transfer path B, the protection element 30 effectively raises the temperature of the heating resistor 64, and when energized by the current control element 50, immediately fuses the low-melting-point metal body 67, thereby making it possible to shut down the charging/discharging electric current path.

Moreover, the protection element 30 may be designed so that, by changing the glass material for the first insulating layer 62 and the glass material for the first glass layer 70, the thermal conductivity of the first glass layer 70 may be made smaller than the thermal conductivity of the first insulating layer 62. With this structure, it becomes possible to suppress heat radiation from the first insulating layer 62 on the first heat transfer path A toward the first glass layer 70 side on the second heat transfer path B. In this case, each of the first insulating layer 62 and the first glass layer 70 is formed in a separated process where glass having a different material is printed and baked.

Figure 7:
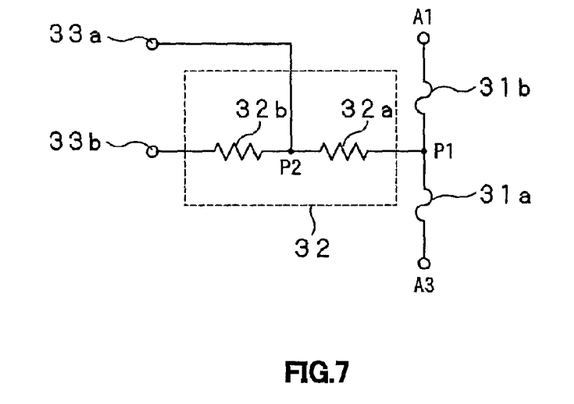
FIG. 7 is a drawing that shows a circuit structure of the other protection element to which the present invention is applied.
Figure 8:
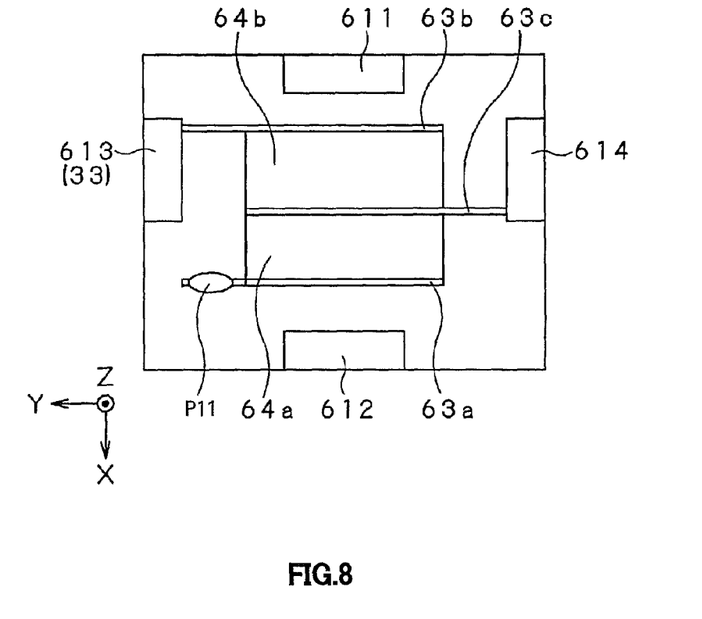
FIG. 8 is a plan view that explains a layer structure of the other protection element to which the present invention is applied.

As shown in FIG. 7, in the protection element 30, upon designing the circuit configuration, a plurality of resistors 32 may be installed (for example, two in FIG. 7), and a terminal portion 33*a* is extended from a contact P2 between the resistors 32*a* and 32*b*, with a terminal portion 33*b* being extended from the end portion of the resistor 32*b*, so that, by selecting terminal portions to be connected to the current control element 50 depending on the number of battery cells, the calorific value of the resistor 32 may be switched. In this case, in the protection element 30, for example, as shown in FIG. 8, a plurality of conductor patterns are formed on the first insulating layer 62 so that the heating resistor 64 is divided into a plurality of portions (two portions, that is, 64*a* and 64*b* in FIG. 8), and the end portion of the rest of the conductor patterns 63*b* and 63*c* that is not connected to the conductor 66 is connected to the connection portions 613 and 614 formed on the side faces of the substrate 60. Thus, by selecting the connection portion to be connected to the current control element 50 depending on the number of batteries, the resistance value of the heating resistor to be conducted upon energizing the protection element 30 is increased or reduced so that the calorific value can be adjusted.

That is, the protection element 30 is allowed to adjust the resistance value of the entire heating resistor in multiple stages by adjusting the number of resistors to generate heat in accordance with a fluctuation band of the voltage value of the battery 10 so that it becomes possible to prevent the voltage value that fluctuates depending on the number of batteries from becoming excessively high relative to the heating resistor 64 to cause damages to the heating resistor 64. With this structure, in the case when the protection element 30 is used for, for example, a battery pack with two cells, one heating resistor 64 is energized, and in the case when it is used for a battery pack with four cells, two heating resistors 64 are energized; thus, even one element may be applied to a plurality of battery packs.

In the structure as shown in FIG. 8 also, the protection element 30 may have a structure in which, in addition to the connection portions 611 and 612, a first glass layer 70 is formed between the conductor 61*b* of the connection portions 613 and 614 and one surface 60*a* of the substrate 60, with a second glass layer 71 being formed between the conductor 61*c* of the connection portions 613 and 614 and the other surface 60*b* of the substrate 60, so that it becomes possible to also suppress heat radiation through the conductor patterns 63*b* and 63*c* and consequently to efficiently accumulate heat of the heating resistor 64 in the low-melting-point metal body. Moreover, the protection element 30 makes it possible to fuse and disconnect the low-melting-point metal body 67 even by the use of a small calorific value, thereby achieving a small-size low-power-consumption heating resistor 64.

The above explanation has been given by exemplifying the protection element 30 that is formed on a charging/discharging path of a battery cell installed in a battery pack; however, in addition to the charging/discharging circuit of a battery, the protection element 30 may be applied to various kinds of electric circuits to be protected from an overcurrent and an overvoltage.

REFERENCE NUMERALS

1 Battery pack, 2 Charging device 10 Battery, 11 to 14 Battery cell, 20 Charging/discharging control circuit, 21, 22 Current control element, 23 Control unit, 30 Protection element, 31 Fuse, 32 Resistor, 33 Terminal portion, 40 Detection circuit, 50 Current control element, 60 Substrate, 61*a* Through hole, 61*b*, 61*c* Conductor, 62 First insulating layer, 63 Conductor pattern, 64 heating resistor, 65 Second insulating layer, 66 Conductor, 67 Low-melting-point metal body, 68 Flux, 69 Cap, 70 First glass layer, 71 Second glass layer, 72, 73 air layer

The invention claimed is:

1. A protection element connected onto an electric current path of an electric circuit comprising:
   an electrically insulating substrate;
   a heating resistor formed on one surface of the electrically insulating substrate with a first electrically insulating layer interposed therebetween;
   a low-melting-point body disposed above the heating resistor with a second electrically insulating layer interposed therebetween and that constitutes part of the electric current path;
   connection portions connected to both ends of the low-melting-point and that electrically connect the electric current path and the low-melting-point metal body; and
   a through hole that penetrates the inside of the electrically insulating substrate,
   wherein
   the connection portions are formed on both the one surface of the electrically insulating substrate with the third electrically insulating layer interposed therebetween and the other surface opposing the one surface of the electrically insulating substrate with a fourth electrically insulating layer interposed therebetween, and
   the through hole is formed in a position where the third electrically insulating layer is overlapped with the electrically insulating layer.

2. The protection element according to claim 1, wherein the third electrically insulating layer is formed only on lower portions of the connection portions.

3. The protection element according to claim 1, wherein the third and fourth electrically insulating layers are formed only on positions where the third and fourth electrically insulating layers are overlapped with the connection portions.

4. The protection element according to claim 1, wherein the second electrically insulating layer has a thermal conductivity equal or greater than the thermal conductivity of the first electrically insulating layer.

5. The protection element according to claim 4, wherein the first and second electrically insulating layers are glass layers.

6. The protection element according to claim 1, wherein the third electrically insulating layer has a thermal conductivity lower than the thermal conductivity of the first electrically insulating layer.

7. The protection element according to claim 2, wherein the connection portions are formed on both the one surface of the electrically insulating substrate with the third electrically insulating layer interposed therebetween and the other surface opposing the one surface of the electrically insulating substrate with a fourth electrically insulating layer interposed therebetween.

8. The protection element according to claim 2, wherein the second electrically insulating layer has a thermal conductivity equal or greater than the thermal conductivity of the first electrically insulating layer.

9. The protection element according to claim 1, wherein the second electrically insulating layer has a thermal conductivity equal or greater than the thermal conductivity of the first electrically insulating layer.

10. The protection element according to claim 3, wherein the second electrically insulating layer has a thermal conductivity equal or greater than the thermal conductivity of the first electrically insulating layer.

11. The protection element according to claim 1, wherein the third and fourth electrically insulating layers are glass layers.

12. The protection element according to claim 3, wherein the third and fourth electrically insulating layers are glass layers.

13. A battery control device comprising:
a charging/discharging control circuit that is connected onto a charging/discharging electric current path of a battery constituted by a battery cell capable of being charged and discharged, and controls the charging/discharging operation of the battery;
a detection circuit that detects a voltage value of the battery cell;
a protection element that shuts down the charging/discharging electric current path when a voltage value of the battery cell detected by the detection circuit gets out of a predetermined range; and
a control circuit element that drives the protection element, wherein the protection element circuit comprises:
an electrically insulating substrate; a heating resistor formed on one surface of the electrically insulating substrate with a first electrically insulating layer interposed therebetween;
a low-melting-point body disposed above the heating resistor with a second electrically insulating layer interposed therebetween and that constitutes part of the electric current path;
connection portions connected to both ends of the low-melting-point and that electrically connect the electric current path and the low-melting-point metal body; and
a through hole that penetrates the inside of the electrically insulating substrate,
wherein
the connection portions are formed on both the one surface of the electrically insulating substrate with the third electrically insulating layer interposed therebetween and the other surface opposing the one surface of the electrically insulating substrate with a fourth electrically insulating layer interposed therebetween, and
the through hole is formed in a position where the third electrically insulating layer is overlapped with the electrically insulating layer.

14. A battery pack comprising:
a battery constituted by a battery cell capable of being charged and discharged;
a charging/discharging control circuit that is connected onto a charging/discharging electric current path of a battery constituted by a battery cell capable of being charged and discharged, and controls the charging/discharging operation of the battery;
a detection circuit that detects a voltage value of the battery cell;
a protection element that shuts down the charging/discharging electric current path when a voltage value of the battery cell detected by the detection circuit gets out of a predetermined range; and
a control circuit element that drives the protection element, wherein the protection element circuit comprises:
an electrically insulating substrate; a heating resistor formed on one surface of the electrically insulating substrate with a first electrically insulating layer interposed therebetween;
a low-melting-point body disposed above the heating resistor with a second electrically insulating layer interposed therebetween and that constitutes part of the electric current path;
connection portions connected to both ends of the low-melting-point and that electrically connect the electric current path and the low-melting-point metal body; and
a through hole that penetrates the inside of the electrically insulating substrate,
wherein
the connection portions are formed on both the one surface of the electrically insulating substrate with the third electrically insulating layer interposed therebetween and the other surface opposing the one surface of the electrically insulating substrate with a fourth electrically insulating layer interposed therebetween, and
the through hole is formed in a position where the third electrically insulating layer is overlapped with the electrically insulating layer.

* * * * *